Dec. 6, 1932.   G. ZIEGLER   1,889,940
WINDING FOR ELECTRICAL MACHINES
Filed Feb. 20, 1930   3 Sheets-Sheet 1
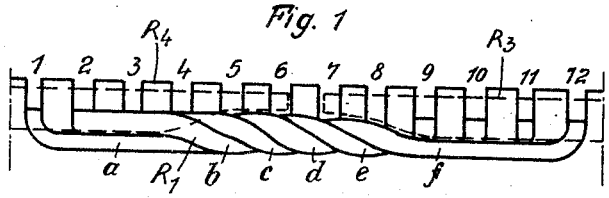
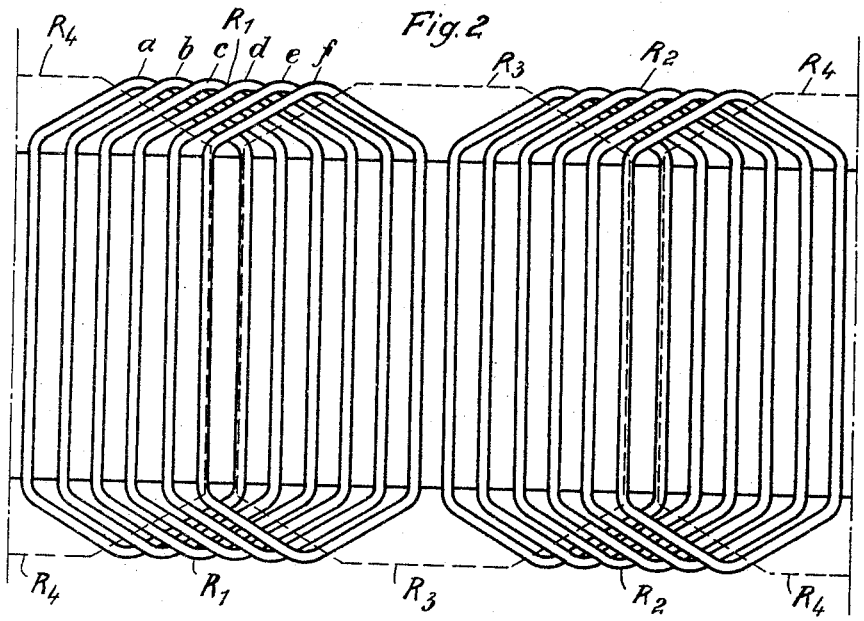
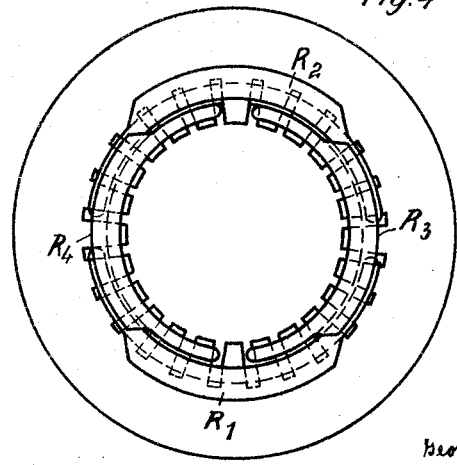
Inventor
Georg Ziegler
by Knight Bro.
attorneys Patented Dec. 6, 1932

1,889,940

UNITED STATES PATENT OFFICE

GEORG ZIEGLER, OF NUREMBERG, GERMANY, ASSIGNOR TO SIEMENS-SCHUCKERTWERKE AKTIENGESELLSCHAFT, OF BERLIN-SIEMENSSTADT, GERMANY, A CORPORATION OF GERMANY

WINDING FOR ELECTRICAL MACHINES

Application filed February 20, 1930, Serial No. 431,034, and in Germany February 16, 1929.

My invention relates to electric machines and more particularly to a winding for slotted field magnets thereof. The object of my invention is to provide a winding simple to construct and which is so disposed in the field magnet as to be easily removable for repairing in case of defects arising in one or several coils.

According to my invention at least the majority, if not all, of the coils of the winding—which may be of the single or multilayer type—are assembled to form various groups of a particular type. Such a complex of coils is called a coil grate. The term "grate", also used in the claims, is chosen because the parallel sides of such a group of coils are all located in one layer and resemble, as appears for instance from Fig. 2, in their assembly the grate or a grate section of a furnace. Such a grate consists of different coils displaced in relation to one another, both coil sides being embedded in the slots at the same depth. The coils of a grate overlap one another; they do not, however, overlap the coils of the adjacent coil grates of the same layer.

The greatest advantages will be obtained if in all existing layers of the winding, equal coil grates are formed of equal coils with a slot pitch $y$ in such a manner that each coil grate is composed of $y$ coils and carried with its $2y$ coil sides in $2y$ successive slots.

The winding according to the invention may for instance be advantageously used for stators of alternating current induction motors.

In order that my invention may be clearly understood reference will be made to the accompanying drawings in which are shown two examples of two-layer windings embodying my invention and in which Fig. 1 is a developed front view of one half of the stator circumference provided with twelve slots, of a four-pole three-phase induction motor with two slots for each pole and phase and having a coil grate at the bottom layer, the coils of which are dimensioned with a slot pitch $y=6$, i. e. equal to the number of slots for each pole, a so-called full-pitch winding being in this case involved.

Fig. 2 is the plan of the stator portion shown in Fig. 1 in the axial direction.

Fig. 4 is a front view of the stator with the winding designed according to Figs. 1–3.

Figure 3:
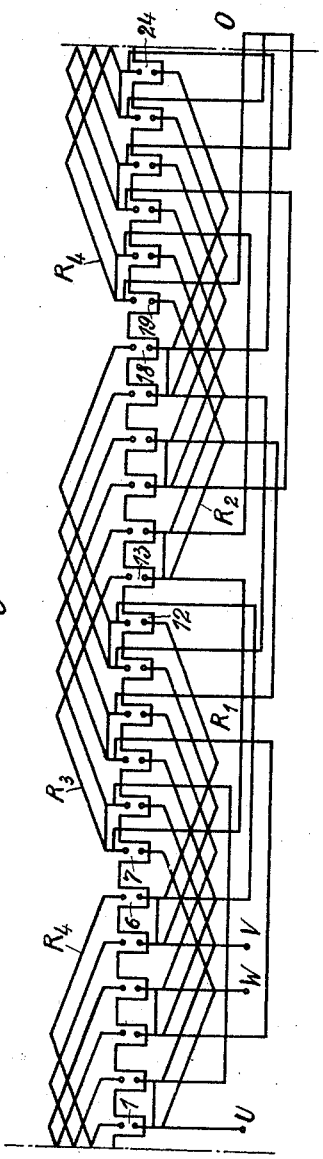
Fig. 3 is a diagram of the complete winding shown partly in Figs. 1 and 2. It is a developed front view of the entire stator circumference with the ends of the coil sides represented by circles and with the coil ends turned down in the plan of the drawings.
Figure 5:
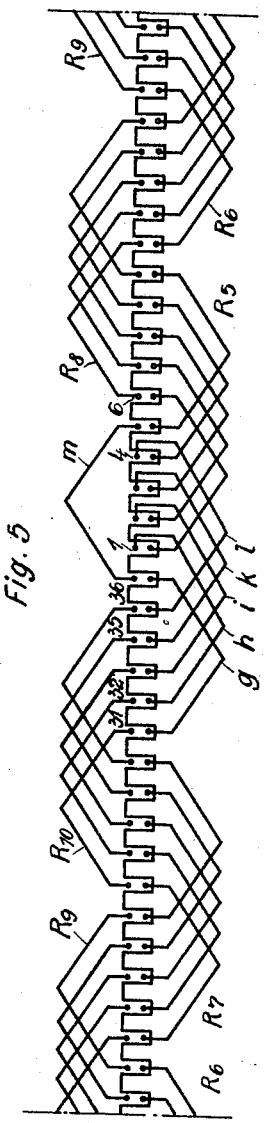
Fig. 5 is the diagram shown in a manner corresponding to that of Fig. 3 of a six-pole winding with six slots for each pole which according to the invention is constructed of equals coils with a pitch $y=5$, with six coil grates, whereby filling coils and rising coils are utilized.
Figure 6:
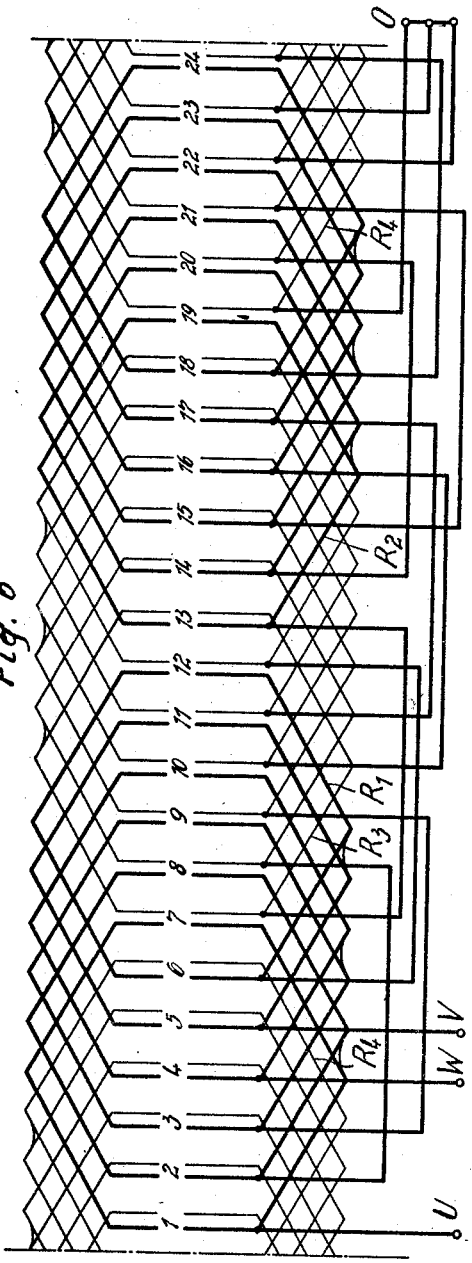
Figure 7:
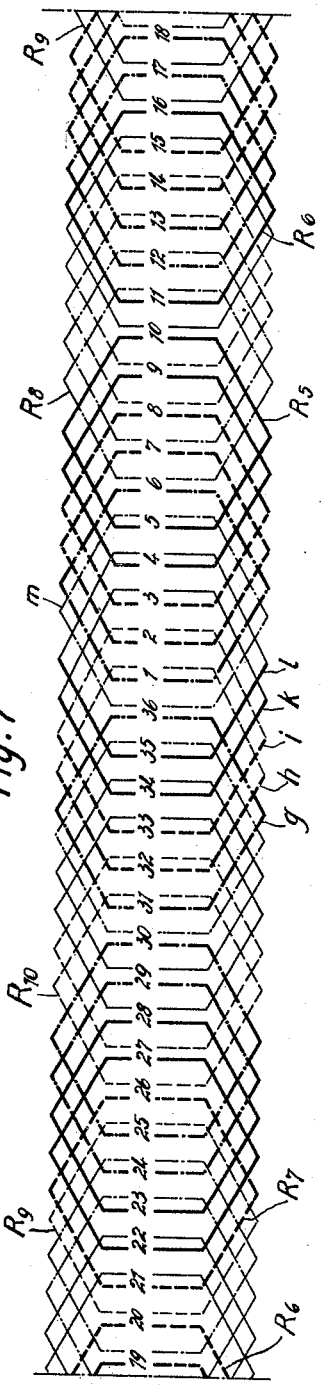

In Fig. 6 is shown a complete developed circumferential view of the diagram of the winding according to Fig. 3, and in Fig. 7 a similar diagram of the winding according to Fig. 5.

The coils placed in the bottom layer are indicated by heavy lines, those placed in the top layer by light lines; furthermore the coils in Fig. 7 which belong to various phases are represented by dash lines and dot-and-dash lines.

Referring to Figs. 1 and 2 of the drawings the illustrated circumferential half of the slotted stator magnet has twelve slots indicated by the reference numerals 1 to 12. At the bottom of these slots commencing with slot 1 are located the six equal coils $a$, $b$, $c$, $d$, $e$, $f$ in such a manner that, as shown in Fig. 2, they overlap one another and, as illustrated in Fig. 1, lie at the bottom of the slots each with both sides. The coils are designed with the pitch 6. The six coils together form a coil grating $R_1$ which with its twelve coil-sides is imbedded in the twelve consecutive slots.

When this coil grating of the bottom-slot layer has been placed in position a similar coil grating $R_2$, Fig. 2, is inserted into the remaining twelve slots as part of the slot bottom layer, proceeding along the circumference in the same direction. The bottom halves of all the slots are now occupied. In the slot top layer the coil grating $R_3$ and $R_4$ are now formed from coils arranged similar to the gratings $R_1$ and $R_2$. When forming the grating $R_3$ the first coil-side is placed into the slot 7. The grating $R_3$ thus occupies the top layer of slots 7 to 18 and the adjoining grating $R_4$ the top layer of slots 19 to 24 and 1 to 6, as shown in Fig. 3 of the drawings.

By displacing the coil gratings of the slot top layer in relation to the coil gratings of the slot bottom layer, the result is attained that the thickened outside ends of gratings of each layer produced by the outside overlapping of the coils are located in the spaces between the thickened grating ends of the other layers. This is particularly clearly illustrated in Fig. 4, and also in Figs. 1 and 2, where the outlines of the coil gratings $R_3$ and $R_4$ of the top layer are indicated in dotted lines. This arrangement has the advantage that the space is reduced which the parts of the winding structure located outside the magnet structure require in the radial direction.

In Figs. 3 and 6 are also shown the external connections of the coils by which the winding structure is electrically subdivided into three equal star-connected phases and displaced in relation to one another by 120 electrical degrees.

As will be seen from the figures the windings of the several layers are interlinked with one another only by the external connections.

The coil pitch $y$ may in a known manner also be made smaller than the number $n$ of slots per pole and phase with a view to saving copper for the end connectors. The so-called corded winding is then obtained. It may happen, that after the insertion of the largest possible number of coil grates, some slots remain empty, which are designated here as residual slots. In this case the winding is made of two layers and at least a portion of the residual slots is occupied by the rising coils, which are preferably designed with the same pitch $y$ as the coils of the grates, and which are placed in the known manner each with one side in the bottom layer and with the other side in the top layer of the winding. When using such rising coils which may be grouped together or be distributed over the circumference of the winding, the two layers cease being independent since they are not only electrically interlinked with one another by the external connections but are also interleaved with one another by reason of the rising coils.

If it should happen when carrying out the two-layer winding that after inserting the closely disposed coil grates of the bottom layer, a number of residual slots remain empty, the number of which is greater than the coil pitch $y$, and that only coils with the same pitch should be used for the entire winding, the residual slots will be overlaid in another way.

Such a winding is schematically shown in Figs. 5 and 7. The two-layer winding is substantially composed of the coil grates $R_5$, $R_6$, $R_7$, in the bottom layer and of the coil grates $R_8$, $R_9$, and $R_{10}$ in the top layer. The grates are equal, each consisting of five equal coils with the pitch 5, so that each of the grates has its coil sides disposed in successive slots. After thus placing the three closely adjacent coil grates $R_5$, $R_6$, and $R_7$ of the bottom layer, six residual slots 31–36 remain empty. The filling coil $g$, which is also designed with the pitch 5, is at first embedded in the bottom of two of these residual slots, the total number of which slots is by 1 greater than the coil pitch. In the bottom of the remaining four residual slots 32–35 is embedded one side each of the four rising coils $h$, $i$, $k$, $l$. The other side of these rising coils is used as the top layer for one of each of the coil sides of the coil grate $R_5$, i. e. the right hand side of coil $h$ is carried as the top layer in slot 1, the coil $i$ as top layer in slot 2, the coil $k$ in the slot 3, and the coil $l$ in the slot 4.

A filling coil $m$ is then placed in the top layer of slots 36 and 5, said coil being located in the same way in relation to the rising coils as the filling coil $g$ in the bottom layer. By reason of the presence in the upper layer of both sides of the filling coil $m$ and of the four upper sides of the rising coils, six of the thirty-six slot spaces of the top layer are filled, so that exactly thirty upper slot spaces remain free for the three coil grates of the top layer each with ten coil sides disposed exclusively in the top layer.

The connections by means of which this winding structure can be electrically subdivided into three phases are not shown in Figs. 5 and 7 of the drawings. The three phases are not accurately equal. The winding on being excited by a revolving pole wheel with six poles would thus supply voltages differing slightly from one another in value and not displaced from one another in phase by accurately 120 degrees.

In this winding structure also the thickened coil ends of the gratings of each layer lie in the spaces between the coil ends of the gratings of the other layer as shown in Fig. 5.

The mode of filling up the residual slots illustrated in Fig. 5 is by no means the only possible one. The coil gratings $R_5$, $R_6$, $R_7$ of the bottom-slot layer might, for instance, also be so inserted that between any two of them there remain two residual slots and these six residual slots might be occupied with three times two rising coils.

The advantage of the method is that repairs of the winding are greatly facilitated. For instance if a coil of a single-layer winding structure should become defective, it would in the most unfavorable case only be necessary to remove a whole coil grating in order to renew the defective coil. In the most favorable case, viz. if the defective coil is the last placed coil of a grating, only this coil need be removed.

In the case of a two-layer winding the above holds good for the top layer of the slots. If a coil of the bottom layer is damaged it is only necessary to remove two coil gratings of the top layer, in order to render accessible the grating of the bottom layer which contains the defective coil.

To emphasize this advantage more fully it may be pointed out that in case of a defect in a coil of a double-layer winding structure constructed, in the usual manner, of equal coils located with one side in the slot top layer and with the other side in the slot bottom layer, it is not possible to remove one or more coils completely, i. e. with both sides, from the iron body and to replace it by a new one, without lifting the sides of all coils, located between the sides of the defective coil. The distortion or warping of the coils caused thereby has frequently led to injuries also of these coils, which in extreme cases may have the result that on account of originally only one or two defective coils it is necessary to replace the entire winding.

The advantage mentioned is greatest if the multi-layer winding structure is carried out without braiding by rising coils.

I claim as my invention:

1. In electric machines or the like, an armature member having slots distributed over its face, a multi-layer winding composed of a plurality of coils of suitable pitch carried in said slots, the said coils being divided into groups, each group forming a grate, said grates being disposed closely adjacent to one another, the several coils of each grate being displaced in relation to one another along the armature face and overlapping one another and having both sides located at the same depth in their respective slots.

2. In electric machines or the like, an armature member having slots distributed over its face, a multi-layer winding composed of a plurality of coils in each layer carried in said slots, the coils in each layer being divided into equal groups and having the slot pitch $y$, each group forming a grate and consisting of $y$ coils whose sides are disposed in $2y$ successive slots, the grates being closely adjacent to one another along the armature face, the several coils of each grate being displaced in relation to one another along the armature face and overlapping one another and having both sides located at the same depth in their respective slots.

3. In electric machines or the like, an armature member having slots distributed over its face, a two-layer winding composed of a plurality of coils carried in said slots, the top and bottom layer of said winding each being divided into several groups of coils, of the slot pitch $y$, each group forming a grate consisting of $y$ coils whose sides are disposed in $2y$ successive slots, the grates in both layers being disposed closely adjacent to one another along the armature face, the grates of the top layer beginning at a point coinciding at least approximately with the centre of a coil grate of the bottom layer, the several coils of each grate being displaced in relation to one another along the armature face and overlapping one another and having both sides located at the same depth in their respective slots.

4. In electric machines or the like, an armature member having slots distributed along its face, a multi-layer winding composed of a plurality of coils in each layer, carried in said slots, the coils in each layer being divided into groups of coils of the slot pitch $y$, each group forming a grate and consisting of $y$ coils, whose sides are disposed in $2y$ successive slots, the grates being disposed closely adjacent to one another along the armature face, the several coils of each grate being displaced in relation to one another along the armature face and overlapping one another and having both sides located at the same depth in their respective slots, the total number of the slots, being greater than the total number of coil sides of all grates capable of being embedded in one layer, and rising coils disposed in at least a portion of the slot spaces not taken up by grate coil sides, the sides of said rising coils being disposed in the several layers of the winding.

5. In electric machines or the like, an armature member having slots distributed along its face, a two-layer winding composed of a plurality of coils, carried in said slots, the coils in each layer being divided into several groups of coils of the slot pitch $y$, each group forming a grate and consisting of $y$ coils whose sides are disposed in $2y$ successive slots, the grates in both layers being disposed closely adjacent to one another along the armature face, the several coils of each grate being displaced in relation to one another and overlapping one another and having both sides located at the same depth in their respective slots, the total number of slots being greater than the total number of coil sides of all grates, capable of being embedded in a layer, and a plurality of interlinking residual coils of the slot pitch $y$ for the residual slots, the number of said residual coils being greater than $y$, the highest possible number of the residual coils being disposed with both sides in the bottom spaces of said residual slots, a number of said residual coils being rising coils disposed in the still remaining residual slots and lying with one side in the bottom layer and with the other side in the top layer of the winding, and another number of residual coils—corresponding in number to the number of residual coils embedded in the bottom spaces of said residual slots, and of rising coils—being wrapped around the sides of said rising coils.

In testimony whereof I affix my signature.

GEORG ZIEGLER.